United States Patent
Cho et al.

(10) Patent No.: US 10,121,565 B2
(45) Date of Patent: Nov. 6, 2018

(54) NANOPARTICLE MULTILAYER FILM

(71) Applicants: SAMSUNG ELECTRONICS CO., LTD., Suwon-si (KR); AJOU UNIVERSITY INDUSTRY-ACADEMIC COOPERATION FOUNDATION, Suwon-si (KR)

(72) Inventors: Kyungsang Cho, Gwacheon-si (KR); Sangwook Kim, Suwon-si (KR); Donghyeok Choi, Suwon-si (KR)

(73) Assignees: SAMSUNG ELECTRONICS CO., LTD., Suwon-si (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 646 days.

(21) Appl. No.: 14/556,344

(22) Filed: Dec. 1, 2014

(65) Prior Publication Data

US 2015/0243402 A1    Aug. 27, 2015

(30) Foreign Application Priority Data

Feb. 27, 2014   (KR) .................. 10-2014-0023714

(51) Int. Cl.
*H01B 1/06* (2006.01)
*B01J 13/02* (2006.01)
(Continued)

(52) U.S. Cl.
CPC ................ *H01B 1/06* (2013.01); *B01J 13/02* (2013.01); *C03C 17/347* (2013.01);
(Continued)

(58) Field of Classification Search
CPC ... H01B 1/06; H01B 1/10; B01J 13/02; C03C 17/347; C03C 17/3476; C03C 2218/31;
(Continued)

(56) References Cited

U.S. PATENT DOCUMENTS

| 2010/0019238 A1 | 1/2010 | Mitzi et al. |
| 2010/0098902 A1 | 4/2010 | Kotov et al. |
| 2012/0202047 A1 | 8/2012 | Welch et al. |

FOREIGN PATENT DOCUMENTS

| JP | 2003-205568 A | 7/2003 | |
| KR | 10-1140309 B1 | 5/2012 | |
| WO | WO-2012158847 | * 11/2012 | ......... H01L 29/0669 |

OTHER PUBLICATIONS

Jaffar, et al.; "Layer-by-Layer Surface Modification and Patterned Electrostatic Deposition of Quantum Dots", Nano Letters, Jul. 2004, vol. 4, No. 8, 5 pages total.

(Continued)

*Primary Examiner* — Jonathan C Langman
(74) *Attorney, Agent, or Firm* — Sughrue Mion, PLLC

(57) ABSTRACT

A nanoparticle multilayer thin film is provided in which nanoparticles which are not electrically insulated from each other are spaced apart from one another at a reduced distance. The nanoparticle multilayer film includes: at least one first nanoparticle layer including first nanoparticles that are surface-modified with a cationic metal-chalcogenide compound; and at least one second nanoparticle layer including second nanoparticles that are surface-modified with an anionic metal-chalcogenide compound, wherein the first nanoparticle layer and the second nanoparticle layer are alternately stacked upon one another.

13 Claims, 4 Drawing Sheets

(51) Int. Cl.
*H01B 1/10* (2006.01)
*C03C 17/34* (2006.01)
*B82Y 30/00* (2011.01)

(52) U.S. Cl.
CPC ........... *C03C 17/3476* (2013.01); *H01B 1/10* (2013.01); *B82Y 30/00* (2013.01); *C03C 2218/31* (2013.01)

(58) Field of Classification Search
CPC .......... B82Y 30/00; B05D 1/38; B05D 3/007; B05D 7/50
See application file for complete search history.

(56) References Cited

OTHER PUBLICATIONS

Lim, et al.; "Preparation of Highly Luminescent Nanocrystals and Their Application to Light-Emitting Diodes", Advanced Materials, Aug. 2007, vol. 19, Issue 15, 6 pages total.
Kovalenko, et al.; "Colloidal Nanocrystals with Molecular Metal Chalcogenide Surface Ligands", Science, Jun. 2009, vol. 324, No. 5933, 5 pages total.

* cited by examiner

NANOPARTICLE MULTILAYER FILM

CROSS-REFERENCE TO RELATED APPLICATIONS

This application claims the priority for Korean Patent Application No. 10-2014-0023714, filed on Feb. 27, 2014, in the Korean Intellectual Property Office, the disclosure of which is incorporated herein by reference.

BACKGROUND

1. Field

The present disclosure relates to nanoparticle multilayer films.

2. Description of the Related Art

Nanoparticle multilayer films refer to films with a plurality of nanoparticle layers stacked upon one another. Nanoparticle multilayer films may be used as, for example, semiconductor materials, optic materials, energy storing materials, magnetic materials, and magneto-optic materials.

A nanoparticle multilayer film may be formed in a layer-by-layer manner using quantum dots or nanoparticles of which the surfaces are modified to have charges. For example, quantum dots coated with positively charged polymers, and quantum dots coated with negatively charged polymers may be used to alternately coat a substrate to form a quantum dot (QD)-polymer composite material multilayer thin film. In another example, quantum dots that are surface-modified with cationic organic ligands or polymers, and quantum dots that are surface-modified with anionic organic ligands or polymers may be used to induce spontaneous layer-by-layer coating of the surface-modified quantum dots on their own due to the charges thereof. See, e.g., Nano Letters, 2004, 4 (8), pp 1421-1425.

In a nanoparticle multilayer film formed using such a method, an organic ligand or polymer could be present between nanoparticles and/or between nanoparticle layers. The presence of the organic ligand or polymer between the nanoparticles may cause an electrical insulation of the nanoparticle multilayer film and prevent a coupling of the nanoparticles due to an increased distance between the nanoparticles. It is known that coupling of nanoparticles does not occur when the nanoparticles are spaced apart from one another by a distance of about 1.8 nm or larger.

Thus, the nanoparticle multilayer films formed using nanoparticles that are surface-modified with organic ligands or polymers may perform poorly in some application fields where, for example, electric conductivity or coupling of nanoparticles is required.

SUMMARY

Provided are nanoparticle multilayer thin films in which nanoparticles are not electrically insulated from each other and a distance between adjacent nanoparticles is as small as sufficient to form a coupling of the adjacent nanoparticles.

Additional aspects will be set forth in part in the description which follows and, in part, will be apparent from the description, or may be learned by practice of the presented embodiments.

An embodiment of a nanoparticle multilayer thin film according to a first aspect of the present disclosure includes:

at least one first nanoparticle layer including first nanoparticles that are surface-modified with a cationic metal-chalcogenide compound; and at least one second nanoparticle layer including second nanoparticles that are surface-modified with an anionic metal-chalcogenide compound, wherein the first nanoparticle layer and the second nanoparticle layer are alternately stacked upon one another. The first and the second nanoparticle layers may be in contact with each other.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
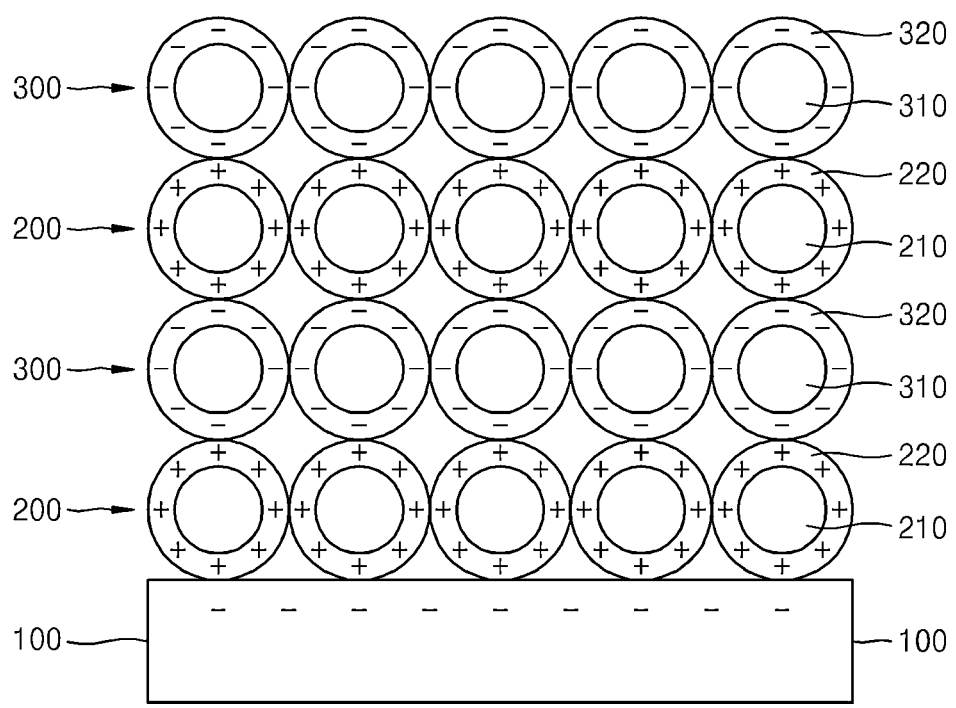
FIG. 1 is a schematic cross-sectional view of an embodiment of a nanoparticle multilayer film according to a first aspect of the present disclosure.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to an embodiment of the present disclosure, a nanoparticle multilayer film includes: at least one first nanoparticle layer including a first nanoparticle that is surface-modified with a cationic metal-chalcogenide compound; and at least one second nanoparticle layer including a second nanoparticle that is surface-modified with an anionic metal-chalcogenide compound, wherein the first nanoparticle layer and the second nanoparticle layer are alternately stacked upon one another.

FIG. 1 is a schematic cross-sectional view of an embodiment of a nanoparticle multilayer film, according to a first aspect of the present disclosure. Referring to FIG. 1, the nanoparticle multilayer film includes first nanoparticle layers 200 and second nanoparticle layers 300 that are alternately stacked on a substrate 100. The surface of the substrate 100 may be negatively charged. The first nanoparticle layer 200 includes nanoparticles 210 that are surface-modified with a layer 220 of a cationic metal-chalcogenide compound. Thus, the nanoparticles 210 of the first nanoparticle layer 200 may be strongly adhered to the surface of the substrate 100 by electrostatic attraction. The second nanoparticle layer 300 includes nanoparticles 310 that are surface-modified with a layer 320 of an anionic metal-chalcogenide compound. Thus, the nanoparticles 310 of the second nanoparticle layer 300 may be strongly adhered to the nanoparticles 210 of the first nanoparticle layer 200 by electrostatic attraction. In the embodiment of FIG. 1, the surface of the substrate 100 is negatively charged. However, in other embodiment, the surface of the substrate 100 may be positively charged. In this case, the second nanoparticle layer 300 including the nanoparticles 310 that are surface-modified with the layer 320 of an anionic metal-chalcogenide compound may be first adhered to the positively charged surface of the substrate 100. The first nanoparticles and the second nanoparticles may be the same or different from each other.

Figure 2:
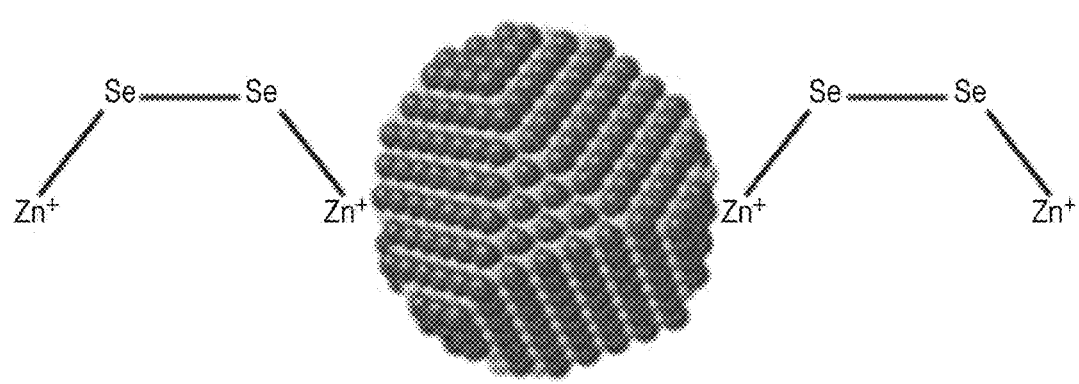
FIG. 2 is a schematic view of a quantum dot nanoparticle of which surface is modified with $Zn_2Se_2$, a cationic metal-chalcogenide compound, according to an embodiment of the present disclosure.

Non-limiting examples of the cationic metal-chalcogenide compound are $Zn_2S_2$, $Zn_2Se_2$, $Zn_2Te_2$, $Cu_2S_2$, $Cu_2Se_2$, $Cu_2Te_2$, $Mn_2S_2$, $Mn_2Se_2$, $Mn_2Te_2$, $Fe_2S_2$, $Fe_2Se_2$, $Fe_2Te_2$, $Co_2S_2$, $Co_2Se_2$, $Co_2Te_2$, or a mixture thereof. In the cationic metal-chalcogenide compounds, metal atoms may exhibit positive charge. For example, in $Zn_2S_2$ having a bonding structure of Zn—S—S—Zn, one of the valence electrons of Zn is covalently bonded to S, but the other valence electron of Zn is not bonded to S. Zn is a Group 2 element having electron-donor properties, and thus, in a solution, it may lose the other valence electron which is not bonded to S, and may be positively charged in a solution. Other cationic metal-chalcogenide compounds may be positively charged in a solution according to a same or similar mechanism. FIG. 2 is a schematic view of a quantum dot nanoparticle of which surface is modified with a cationic metal-chalcogenide compound ($Zn_2Se_2$), according to an embodiment of the present disclosure. Referring to FIG. 2, Zn atoms of $Zn_2Se_2$ are in the form of a cation, and are bonded to the surface of the quantum dot. The Zn atoms are positively charged, and thus may be bound to an anionic component of the quantum dot nanoparticle, for example, to Se atoms of CdSe quantum dot, or may also be bonded in the form of an orbit.

A cationic metal-chalcogenide compound may be produced in a known method. In an embodiment of the present disclosure, the cationic metal-chalcogenide compound may be prepared, for example, by a method that includes:

reacting a chalcogen element with $NaBH_4$ to obtain a sodium-chalcogenide compound;

reacting the sodium-chalcogenide compound with a metal perchlorate to obtain a metal-chalcogenide perchlorate; and reacting the metal-chalcogenide perchlorate with ethanol amine to obtain the metal-chalcogenide compound.

In this method, it is noted that the sodium chalcogenide compound is first prepared as an intermediate which is readily formed, and then, Na atoms of the sodium chalcogenide compound may be substituted with, for example, zinc atoms to obtain zinc chalcogenide.

A chalcogen may be sulfur (S), selenium (Se), or tellurium (Te). Zinc-chalcogenide compounds may be $Zn_2S_2$, $Zn_2Se_2$, or $Zn_2Te_2$.

In the reaction of the chalcogen element with $NaBH_4$ to generate the sodium-chalcogenide compound, the reaction medium may be an alcohol, in particular a lower alcohol, for example, methanol, ethanol, butanol, or isopropanol. The amounts of the chalcogen element and $NaBH_4$ may be determined in accordance with the reaction scheme below. The reaction may be conducted under, for example, an oxidation atmosphere or an inert atmosphere. The reaction temperature may be, for example, in a range of about 20° C. to about 200° C. In an embodiment using Se and $NaBH_4$ in ethanol, a sodium-chalcogenide compound (i.e., $Na_2Se_2$) may be obtained according to the following reaction scheme:

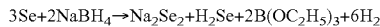

$$3Se + 2NaBH_4 \rightarrow Na_2Se_2 + H_2Se + 2B(OC_2H_5)_3 + 6H_2$$

In the reaction of the sodium-chalcogenide compound with a metal perchlorate to obtain a metal-chalcogenide perchlorate, the reaction medium may be an alcohol, in particular a lower alcohol, for example, methanol, ethanol, butanol, or isopropanol. The reaction may be performed under, for example, an oxidation atmosphere or an inert atmosphere. The reaction temperature may be, for example, in a range of about 20° C. to about 200° C. The metal perchlorate may be zinc perchlorate, tin perchlorate, indium perchlorate, antimony perchlorate, sodium perchlorate, silver perchlorate, iron perchlorate, potassium perchlorate, magnesium perchlorate, barium perchlorate, calcium perchlorate, cadmium perchlorate, aluminum perchlorate, manganese perchlorate, platinum perchlorate, or a combination thereof.

In an embodiment using $Na_2Se_2$ and $Zn(ClO_4)_2$, a zinc-chalcogenide perchlorate (i.e., $Zn_2Se_2(ClO_4)_2$) may be prepared according to the following reaction scheme:

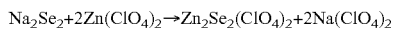

$$Na_2Se_2 + 2Zn(ClO_4)_2 \rightarrow Zn_2Se_2(ClO_4)_2 + 2Na(ClO_4)_2$$

In the reaction of the metal-chalcogenide perchlorate with ethanol amine to obtain a metal-chalcogenide compound, the reaction medium may be, for example, ethanol amine, hydrazine, or a hydrazine hydrate. The reaction may be performed under, for example, an oxidation atmosphere or an inert atmosphere. The reaction temperature may be, for example, in a range of about 20° C. to about 200° C. The metal-chalcogenide compound generated in this step may be in the form of a complex of a metal chalcogenide with ethanol amine, or a metal-chalcogenide coordinated by ethanol amine. In some embodiments, the metal-chalcogenide compound may be in the form of a complex of a metal-chalcogenide with hydrazine or hydrazine hydrate, or a metal-chalcogenide coordinated by hydrazine or hydrazine hydrate.

In some embodiments, the nanoparticle that is surface-modified with a cationic metal-chalcogenide compound may be prepared by providing a first dispersion of nanoparticles having a first organic ligand in a first organic solvent;

preparing a second solution of the cationic metal-chalcogenide compound in a second organic solvent;

mixing the first dispersion and the second solution to prepare a mixed solution; and stirring the mixed solution to exchange the first organic ligand of the nanoparticle with the cationic metal-chalcogenide compound.

The nanoparticle in the first dispersion may be coordinated by the first organic ligand.

Non-limiting examples of the first organic ligand are trioctylphosphine (TOP), trioctylphosphine oxide (TOPO), oleic acid, oleylamine, octylamine, trioctyl amine, hexadecylamine, octanethiol, dodecanethiol, hexylphosphonic acid (HPA), tetradecylphosphonic acid (TDPA), octylphosphinic acid (OPA), or a combination thereof.

Non-limiting examples of the first organic solvent are cyclohexane, hexane, chloroform, toluene, octane, chlorobenzene, or a combination thereof.

The second organic solvent in the second solution may be an organic solvent capable of dissolving and dispersing the cationic metal-chalcogenide compound and the nanoparticle, respectively. Non-limiting examples of the second organic solvent are ethanolamine, dimethyl sulfoxide (DMSO), dimethylformamide (DMF), formamide, water, hydrazine, hydrazine hydrate, or a combination thereof.

The first organic ligand coordinated to the nanoparticle may be substituted with the cationic metal-chalcogenide compound by stirring the mixed solution of the first dispersion and the second solution to obtain the nanoparticle that is surface-modified with the cationic metal-chalcogenide compound may be obtained.

In some embodiments, in the mixed solution, a first organic solvent layer of the first dispersion solution and a second organic solvent layer of the second solution are phase-separated from each other. In this case, through the stirring of the mixed solution, the nanoparticle in the first dispersion may migrate into the second organic solvent layer, and the first organic ligand passivating the nanoparticle may be exchanged with the cationic metal-chalcogenide compound in the second organic solvent layer.

The stirring of the mixed solution of the first dispersion and the second solution may be performed, for example, at a temperature of about 20° C. to about 150° C.

The nanoparticle that is surface-modified with the cationic metal-chalcogenide compound may be any nanoparticle and include, but is not limited to, a quantum dot, a metal nanocrystal (NC), a magnetic NC, an oxide NC, a nanowire, or a nanoplate. The nanoparticles may have an average size ranging from about 1 nm to about 100 nm and one skilled in the art may be able to choose desired sizes depending on the use of the multilayer film.

For example, the quantum dots may include CdS, CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, CdHgZnTe, CdZnSeS, CdZnSeTe, CdZnSTe, CdHgSeS, CdHgSeTe, CdHgSTe, HgZnSeS, HgZnSeTe, HgZnSTe; GaN, GaP, GaAs, GaSb, AN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb; SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, SnPbSTe; Si, Ge, SiC, SiGe, or a combination thereof. The quantum dot may have, for example, a core-shell structure or a core-shell-shell structure.

The first nanoparticle layer of the nanoparticle multilayer film, including a nanoparticle that is surface-modified with a cationic metal-chalcogenide compound may be prepared by, for example, a method that includes:

applying a first coating dispersion (or a first coating colloid) including the first nanoparticle that is surface-modified with the cationic metal-chalcogenide compound onto a substrate or the second nanoparticle layer to form a first colloid layer;

drying the first colloid layer to form a unwashed first nanoparticle layer; and washing the unwashed first nanoparticle layer.

The substrate may include any material. Non-limiting examples of the material for the substrate are glass, quartz, sapphire, silicon, semiconductors, metal, or metal oxides (for example, indium tin oxide (ITO)). The substrate may have any shape. Non-limiting examples of the shape of the substrate are a two-dimensional plane, a curved surface, a rod, or a sphere.

The first coating dispersion (or first coating) colloid may include a dispersion medium, and the nanoparticle that is surface-modified with cationic metal-chalcogenide compound and that is dispersed in the dispersion medium.

Non-limiting examples of the dispersion medium included in the first colloid are ethanolamine, dimethyl sulfoxide (DMSO), dimethylformamide (DMF), formamide, water, hydrazine, or hydrazine hydrate.

For example, an amount of the dispersion medium in the first colloid may be, but not limited to, in a range of about 1,000 parts by weight to about 10,000,000 parts by weight based on 100 parts by weight of the nanoparticle that is surface-modified with the cationic metal-chalcogenide compound.

The application of the first colloid onto the substrate or the second nanoparticle layer may be performed by, for example, dipping, spraying, spin coating, painting, drop casting, casting, inkjet printing, thermal deposition, or physical vapor deposition (PVD).

The temperature for drying the first colloid layer on the substrate or the second nanoparticle layer may be, but not limited to, in a range of about room temperature (for example, about 20° C.) to about 300° C.

For example, a washing solution for the unwashed first nanoparticle layer may be, but not limited to, a lower alcohol (e.g., methanol, ethanol, isopropanol, butanol), acetone, or a combination thereof.

For example, a thickness of the resulting first nanoparticle layer may be, but not limited to, in a range of about 6 nm to about 1,000 nm.

For example, the anionic metal-chalcogenide compound may be, but not limited to, at least one of $Sn_2S_6$, $Sn_2Se_6$, $In_2Se_4$, $In_2Te_3$, $Ga_2Se_3$, $CuInSe_2$, $Cu_7S_4$, $Hg_3Se_4$, $Ge_2S$, $Sb_2S_3$, $Sb_2Se_3$, $Sb_2Te_3$, and ZnTe.

The anionic metal-chalcogenide compound may be prepared by, for example, a method including adding metal powder to a chalcogen hydrazine hydrate solution which is obtained by dissolving chalcogen powder in a hydrazine hydrate, and reacting the chalcogen powder with the hydrazine hydrate.

The nanoparticle that is surface-modified with an anionic metal-chalcogenide compound may be prepared by, for example, a method that includes:

providing a first organic solution including nanoparticles having a first organic ligand;

mixing the first organic solution of the nanoparticle having the first organic ligand with an anionic metal-chalcogenide hydrazine hydrate to prepare a mixed solution; and stirring the mixed solution to exchange the first organic ligand of the nanoparticle with the anionic metal-chalcogenide compound hydrazine hydrate.

The anionic metal-chalcogenide compound hydrazine hydrate may be prepared by, for example, preparing a chalcogenide hydrazine hydrate to which metal powder may be added. In more detail, powder of a chalcogenide element (S, Se, or Te) may be dissolved in a hydrazine hydrate ($N_2H_4 \cdot nH_2O$) to prepare a chalcogen hydrazine hydrate in a solution form. For example, sulfur powder may be dissolved in hydrazine monohydrate to prepare a sulfur hydrazine monohydrate solution. For example, instead of hydrazine monohydrate, a hydrazine polyhydrate such as, for example, hydrazine dihydrate, hydrazine trihydrate, hydrate tetrahydrate, hydrazine pentahydrate, or hydrazine hexahydrate, may be used.

Next, a metal in powder form may be added to the chalcogenide hydrazine hydrate solution and then allowed for a reaction with the chalcogenide hydrazine hydrate. The metal may include a metal element or a metal compound. For example, the metal may include Sn, Ga, $Cu_2S$, GeS, $Sb_2Se_3$, $Sb_2Te_3$, $In_2Se_3$, ZnTe, or $In_2Te_3$. A further hydrazine hydrate may be added together with the metal powder. The reaction temperature may be in a range of room temperature to about 200° C. A hydrazine hydrate is a strong reducing agent. Thus, a metal-chalcogenide compound may be synthesized in a hydrazine hydrate solution. The metal-chalcogenide compound in the hydrazine hydrate solution may form a bonding with the hydrazine hydrate to form a metal-chalcogenide compound hydrazine hydrate. The metal-chalcogenide compound hydrazine hydrate may be an metal-chalcogenide compound hydrazine monohydrate, an metal-chalcogenide compound hydrazine dihydrate, an metal-chalcogenide compound hydrazine trihydrate, an metal-chalcogenide compound hydrazine tetrahydrate, an metal-chalcogenide compound hydrazine pentahydrate, an metal-chalcogenide compound hydrazine hexahydrate, or a combination thereof. Hydrazine hydrates are less toxic than hydrazine, and are non-explosive, and thus may be safe for use in synthesis of a metal-chalcogenide compound.

A precipitate remaining in the solution after the reaction may be removed by, for example, centrifugation, to prepare a metal-chalcogenide compound hydrazine hydrate solution (Solution A). In an embodiment, a solvent for the metal-chalcogenide compound hydrazine hydrate solution may be a hydrazine hydrate. For example, a hydrazine monohydrate solution of $Ge_2S$, $Sb_2S_3$, $Sb_2Se_3$, $Sn_2S_6$, $Sn_2Se_6$, $In_2Se_4$, $In_2Te_3$, $Ga_2Se_3$, $CuInSe_2$, $Cu_7S_4$, $Hg_3Se_4$, $Sb_2Te_3$, or ZnTe may be prepared.

The first solution of the nanoparticle having the first organic ligand is a solution wherein the nanoparticles having the first organic ligand are dissolved in or dispersed in the first solvent. The nanoparticle may dispersed as a colloidal form in the first solvent. The nanoparticle may be passivated by the first organic ligand. Non-limiting examples of the first organic ligand include trioctylphosphine (TOP), trioctylphosphine oxide (TOPO), oleic acid, oleylamine, octylamine, trioctyl amine, hexadecylamine, octanethiol, dodecanethiol, hexylphosphonic acid (HPA), tetradecylphosphonic acid (TDPA), octylphosphinic acid (OPA), or a combination thereof. The first solvent for the first organic solution may include, for example, cyclohexane, hexane, chloroform, toluene, octane, chlorobenzene, or a combination thereof.

The first organic solution (solution B) of the nanoparticle having the first organic ligand may be mixed with the metal-chalcogenide compound hydrazine hydrate solution (solution A) to exchange the first organic ligand of the nanoparticle with the metal-chalcogenide compound hydrazine hydrate. To this end, for example, a metal-chalcogenide compound hydrazine monohydrate solution (solution A) may be added to a hydrazine hydrate, and then the first organic solution (solution B) of the nanoparticle having the first organic ligand may be added thereto. For example, the hydrazine hydrate may be a hydrazine monohydrate, a hydrazine dihydrate, a hydrazine trihydrate, a hydrazine tetrahydrate, a hydrazine pentahydrate, a hydrazine hexahydrate, or a combination thereof. The mixed solution may be phase-separated into an upper first organic solution layer and a lower hydrazine hydrate layer. The upper first organic layer may include the nanoparticle having the first organic ligand, and the lower hydrazine hydrate layer may include an excess of the metal-chalcogenide compound. By stirring of the mixed solution, the nanoparticle in the first organic solution layer may migrate into the hydrazine hydrate layer, while the first organic ligand passivating the nanoparticle may be exchanged with the metal-chalcogenide compound ligand of the hydrazine hydrate layer. The stirring temperature may be in a range of room temperature to about 200° C. Through the phase transfer of the nanoparticles from one of the two solvents to the other, the ligand exchange of the nanoparticles may occur, and thus, nanoparticles that are surface-modified with the anionic metal-chalcogenide compound ligand may be prepared.

The nanoparticle that is surface-modified with the anionic metal-chalcogenide compound may be any nanoparticle, and include, but not is limited to, a quantum dot, a metal nanocrystal (NC), a magnetic NC, an oxide NC, a nanowire, or a nanoplate.

The quantum dots may include, for example, CdS, CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, CdHgZnTe, CdZnSeS, CdZnSeTe, CdZnSTe, CdHgSeS, CdHgSeTe, CdHgSTe, HgZnSeS, HgZnSeTe, HgZnSTe; GaN, GaP, GaAs, GaSb, AN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb; SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, SnPbSTe; Si, Ge, SiC, SiGe, or a combination thereof. The quantum dot may have, for example, a core-shell structure or a core-shell-shell structure.

The second nanoparticle layer including a nanoparticle that is surface-modified with an anionic metal-chalcogenide compound may be formed by, for example, a method that includes:

applying a second coating dispersion (or second coating colloid) including the nanoparticle that is surface-modified with the anionic metal-chalcogenide compound onto a substrate or the first nanoparticle layer to form a second colloid layer;

drying the second colloid layer to form a unwashed second nanoparticle layer; and washing the unwashed second nanoparticle layer.

The substrate may include any material. Non-limiting examples of the material for the substrate are glass, quartz, sapphire, silicon, semiconductors, metal, or metal oxides (for example, indium tin oxide (ITO)). The substrate may have any shape. Non-limiting examples of the shape of the substrate are a two-dimensional plane, a curved surface, a rod, or a sphere.

The second coating dispersion or second coating colloid may include a dispersion medium, and the nanoparticles that are surface-modified with an anionic metal-chalcogenide compound and that are dispersed in the dispersion medium.

Non-limiting examples of the dispersion medium included in the second colloid are ethanolamine, dimethyl sulfoxide (DMSO), dimethylformamide (DMF), formamide, water, hydrazine, or hydrazine hydrates.

For example, an amount of the dispersion medium in the second colloid may be, but not limited to, in a range of about 1,000 parts by weight to about 10,000,000 parts by weight based on 100 parts by weight of the nanoparticle that is surface-modified with the anionic metal-chalcogenide compound.

The applying of the second coating dispersion onto the substrate or the first nanoparticle layer may be performed by, for example, dipping, spraying, spin coating, painting, drop casting, casting, inkjet printing, thermal deposition, or physical vapor deposition (PVD).

The temperature for drying the second colloid layer on the substrate or the first nanoparticle layer may be, but not limited to, in a range of about room temperature (for example, about 20° C.) to about 300° C.

For example, a washing solution for the unwashed second nanoparticle layer may be, but not limited to, a lower alcohol (e.g., methanol, ethanol, isopropanol, butanol), acetone, or a combination thereof.

For example, a thickness of the resulting second nanoparticle layer may be, but not limited to, in a range of about 6 nm to about 1,000 nm.

The surface of the nanoparticle in the first nanoparticle layer is modified with the cationic metal-chalcogenide compound. The surface of the nanoparticle in the second nanoparticle layer is modified with the anionic metal-chalcogenide compound. The cationic metal-chalcogenide compound of the first nanoparticle layer and the anionic metal-chalcogenide compound of the second nanoparticle layer may be bonded to each other by, for example, electrostatic attraction force, an ionic bond, or Van der Waals force. Thus, the binding strength between the first nanoparticle layer and the second nanoparticle layer are very strong. The first nanoparticle layer and the second nanoparticle layer may alternate in the nanoparticle multilayer film. Accordingly, all of the nanoparticle layers in the nanoparticle multilayer film may have strong binding strength at the respective interfaces therebetween, and consequently, the nanoparticle multilayer film may have very strong mechanical strength.

The number of the first nanoparticle layers in the nanoparticle multilayer film is not specifically limited. For example, the number of the first nanoparticle layers in the nanoparticle multilayer film may be in a range of 1 to about 200, but is not limited thereto. The number of the second nanoparticle layers in the nanoparticle multilayer film is not specifically limited. For example, the number of the second nanoparticle layers in the nanoparticle multilayer film may be in a range of 1 to about 200, but is not limited thereto. For example, a thickness of the nanoparticle multilayer film may be in a range of about 12 nm to about 2,000 nm, but is not limited thereto. In an embodiment, the nanoparticle multilayer film may have a thickness ranging from about 12 nm to about 1000 nm.

The nanoparticle of the first nanoparticle layer and the nanoparticle of the second nanoparticle layer may be same to or different from each other. The plurality of first nanoparticle layers may include the same or different nanoparticle. The plurality of second nanoparticle layers may include the same or different nanoparticle. The plurality of first nanoparticle layers may include the same or different cationic metal-chalcogenide compound. The plurality of second nanoparticle layers may include the same or different anionic metal-chalcogenide compound.

The cationic metal-chalcogenide compound and the anionic metal-chalcogenide compound may have smaller sizes than conventional organic ligands and polymers used for stabilization of nanoparticles. Accordingly, in the nanoparticle multilayer film, a distance between the nanoparticle of the first nanoparticle layer and the nanoparticle of the second nanoparticle layer, a distance between nanoparticles in the first nanoparticle layer, and a distance between nanoparticles in the second nanoparticle layer may be remarkably reduced. For example, a distance between quantum dots modified with a conventional organic ligand may be about 1 nm to about 2 nm or larger, while a distance between quantum dots modified with a cationic or anionic metal-chalcogenide compound according to any of the above-described embodiments of the present disclosure may be, for example, about 1 nm or smaller, less than 1 nm, about 0.9 nm or smaller, about 0.8 nm or smaller, about 0.7 nm or smaller, about 0.6 nm or smaller, about 0.5 nm or smaller, about 0.4 nm or smaller, about 0.3 nm or smaller, about 0.2 nm or smaller, or about 0.1 nm or smaller. The distance between adjacent nanoparticles may be controlled by, for example, selecting the metal-chalcogenide compound having a desirable molecular size. Accordingly, in the nanoparticle multilayer film according to any of the above-described embodiments of the present disclosure, the coupling, such as, for example, electronic orbital coupling or magnetic coupling, between the nanoparticles may be remarkably enhanced.

Furthermore, the cationic metal-chalcogenide compound and the anionic metal-chalcogenide compound may be electrically semiconductive or electrically conductive. Thus, the nanoparticle multilayer film according to any of the above-described embodiments of the present inventive concept may have remarkably improved electrical conductivity.

For example, a film of gold (Au) nanoparticles modified with a conventional organic ligand may have an electrical conductivity of about $1\times10^{-9}$ S/cm and thus is considered as an insulator, while a multilayer film of nanoparticles modified with a cationic or anionic metal-chalcogenide compound according to any of the above-described embodiments of the present disclosure may have remarkably improved electrical conductivity, for example, typically about 200 S/cm. Due to a synergic effect of the reduced distance between nanoparticles, the nanoparticle multilayer film according to any of the above-described embodiments of the present disclosure may have further enhanced electrical conductivity.

In some embodiments, the nanoparticle multilayer film may be formed on a substrate. The nanoparticle multi-layer film together with the substrate may be applied to various fields. In some other embodiments, the substrate may be separated from the nanoparticle multilayer film, and the nanoparticle multilayer film may be applied alone to various fields. The nanoparticle multilayer film according to any of the above-described embodiments of the present disclosure may be used as a semiconductive material, an optic material, an energy storing material, a magnetic material, a magneto-optic material, a thermoelectric material, or the like.

One or more embodiments of the present inventive concept will now be described in detail with reference to the following examples. However, these examples are only for illustrative purposes and are not intended to limit the scope of the one or more embodiments of the present inventive concept.

EXAMPLES

Preparation Example 1—Synthesis of Cationic Metal-Chalcogenide Compound ($Zn_2Se_2$)

3 g (38 mmol) of Se and 9 g (23.8 mmol) of $NaBH_4$ were added to 100 g of ethanol in a reaction flask. The reaction flask containing the mixture was put into an ice bath to keep the temperature of the mixture from rising above 20° C. The resulting first reaction mixture was reacted under reflux in a nitrogen atmosphere while stirring. The reaction temperature was 80° C., the reaction pressure was atmospheric, and the reaction time was 1.5 hours. As a result, a second reaction mixture including $Na_2Se_2$ was obtained. Byproducts were removed from the second reaction mixture at room temperature using vacuum to obtain 4.5 g of $Na_2Se_2$.

0.043 g (0.2 mmol) of $Na_2Se_2$ and 0.121 g (0.8 mmol) of $Zn(ClO_4)_2$ were each dissolved in 4 g of ethanol to obtain a $Na_2Se_2$ ethanol solution and a $Zn(ClO_4)_2$ ethanol solution, respectively. This $Zn(ClO_4)_2$ ethanol solution was dropwise added to the $Na_2Se_2$ ethanol solution and allow them to react. The resulting third reaction mixture was centrifuged to obtain a fourth reaction mixture including $Zn_2Se_2(ClO_4)_2$. 0.4 g of $Zn_2Se_2(ClO_4)_2$ was obtained from the fourth reaction mixture.

Then, 0.2 g of $Zn_2Se_2(ClO_4)_2$ was dissolved in 4 g of ethanolamine. The resulting fifth reaction mixture was stand for a reaction under stirring. The reaction temperature was 60° C., the reaction pressure was atmospheric, and the reaction time was 1.5 hours. As a result, a sixth reaction mixture including ethanolamine-$Zn_2Se_2$ was obtained.

Preparation Example 2—Preparation of Quantum Dot Surface-Modified with Cationic ($Zn_2Se_2$)

18 mg of $Zn_2Se_2$ was dissolved in 3 mL of ethanolamine to prepare an metal-chalcogenide compound solution. 1 wt % of CdSe (average particle size of 4 nm) was dispersed in hexane to prepare a quantum dot dispersion solution. 0.1 mL of the MCC solution was added to 3 mL of DMSO to prepare an MCC/DMSO solution. 6 g of the MCC/DMSO solution, 1 mL of the quantum dot dispersion solution, and 5 g of hexane were mixed, and stirred at room temperature for 3 hours. As a result, through ligand exchange in which CdSe quantum dots in the hexane layer were slowly migrated into the DMSO layer, a quantum dot ($Zn_2Se_2$—CdSe) surface-modified with the cationic metal-chalcogenide compound was obtained. The quantum dot ($Zn_2Se_2$—CdSe) was precipitated in butanol to obtain 5 mg of $Zn_2Se_2$—CdSe.

Preparation Example 3—Preparation of Coating Dispersion of Quantum Dot Surface-Modified with Cationic ($Zn_2Se_2$)

10 mg of the quantum dot ($Zn_2Se_2$—CdSe) of Preparation Example 2, surface-modified with cationic $Zn_2Se_2$, was mixed with 1,000 mg of dimethylformamide (DMF) used as a dispersion medium to prepare a cationic quantum dot colloid.

Preparation Example 4—Synthesis of Anionic Metal-Chalcogenide Compound ($Sn_2S_6$)

0.32 g (10 mmol) of sulfur (S) powder was dissolved in 10 ml of hydrazine monohydrate to prepare a 1 M sulfur hydrazine monohydrate solution. 3 ml of the 1 M sulfur hydrazine monohydrate solution and 1 ml of hydrazine monohydrate were mixed together to obtain a mixed solution, and 120 mg (1 mmol) of tin (Sn) powder was then added to the mixed solution and then reacted with the same. The reaction was performed at room temperature with stirring for 1 hour. A precipitate resulting from the reaction was removed from the reaction solution by centrifugation to obtain a $Sn_2S_6$ hydrazine monohydrate solution. This $Sn_2S_6$ hydrazine monohydrate solution included a $Sn_2S_6$ hydrazine monohydrate in which $Sn_2S_6$ and hydrazine monohydrate were bound to each other.

Preparation Example 5—Preparation of Quantum Dot (CdSe/CdS/ZnS) Surface-Modified with Anionic $Sn_2S_6$ CdSe/CdS/ZnS quantum dots were dispersed (dissolved) in cyclohexane to prepare a CdSe/CdS/ZnS quantum dot cyclohexane solution (concentration of 5 mg/ml), using a method described in "Advanced materials (2007, 19, pp. 1927-1932)," of which content is incorporated herein by reference. The CdSe/CdS/ZnS quantum dots had a structure of CdSe core/CdS inner shell/ZnS outer shell. Surfaces of the CdSe/CdS/ZnS quantum dots were coordinated with a mixed organic ligand of oleic acid, TOP, TOPO, and trioctylamine.

25 µl of the $Sn_2S_6$ hydrazine monohydrate solution of Preparation Example 4 was added to 2 ml of hydrazine monohydrate, and then 2 ml of the CdSe/CdS/ZnS quantum dot cyclohexane solution was added thereto. In the resulting mixed solution an upper cyclohexane layer and a lower hydrazine monohydrate layer were phase-separated from each other. The cyclohexane layer included CdSe/CdS/ZnS quantum dots, and the hydrazine monohydrate layer included the $Sn_2S_6$ hydrazine monohydrate ligand.

The phase-separated mixed solution was stirred at room temperature for about 72 hours to allow migration of the CdSe/CdS/ZnS quantum dots from the upper cyclohexane layer to the lower hydrazine monohydrate layer. With the migration of the CdSe/CdS/ZnS quantum dots from the cyclohexane layer to the hydrazine monohydrate layer, the mixed organic ligand in the CdSe/CdS/ZnS quantum dot surfaces was exchanged with the $Sn_2S_6$ hydrazine monohydrate ligand.

Preparation Example 6—Preparation of Coating Dispersion of Quantum Dot Surface-Modified with Anionic $Sn_2S_6$ 10 mg of the quantum dot (CdSe/CdS/ZnS) of Preparation Example 5, surface-modified with the anionic metal-chalcogenide compound was mixed with 1,000 mg of dimethyl sulfoxide (DMSO) as a dispersion medium to prepare an anionic quantum dot colloid.

Example 1—Preparation of Nanoparticle Multilayer Film

First, a glass substrate was pre-treated as follows. The glass substrate was treated with ultraviolet (UV) rays and ozone for 15 minutes. Next, the glass substrate was immersed in a mixed solution of 40 mL of ethanol and 1 mL of 3-aminopropyl triethoxysilane (APTES) for about 1 hour, washed with ethanol, and then dried. The glass substrate was then heated at 120° C. for 30 minutes to remove the remaining solvent. As a result, the pre-treated glass substrate was positively charged.

After the pre-treatment, the glass substrate was immersed in the anionic quantum dot coating dispersion of Preparation Example 6 (surface-modified with anionic $Sn_2S_6$) for 10 minutes, and then washed with ethanol. Next, the glass substrate was immersed in the cationic quantum dot coating dispersion of Preparation Example 3 (surface-modified with cationic $Zn_2Se_2$) for 10 minutes, and then washed with ethanol. The above-described processes were repeated four times to prepare a nanoparticle multilayer film on the glass substrate.

Figure 3A:
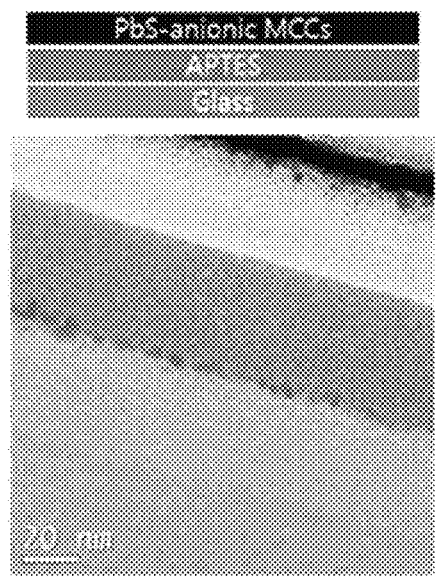
FIG. 3A illustrates a transmission electron microscopic (TEM) image of a cross-section of a first layer of quantum dots that are surface-modified with anionic $Sn_2S_6$ formed on the pre-treated glass substrate.
Figure 3B:
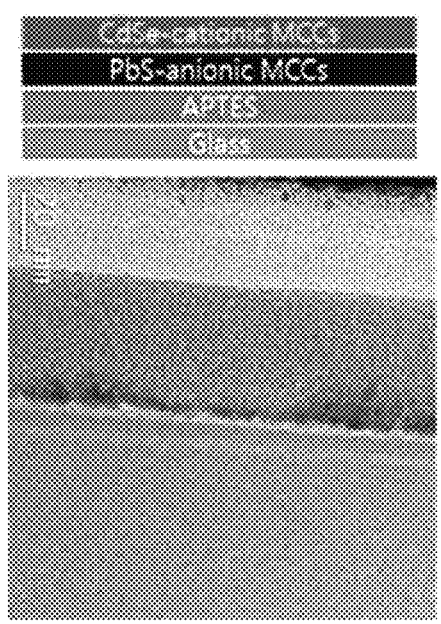
FIG. 3B illustrates a TEM image of a cross-section of a second layer of quantum dots that are surface-modified with cationic $Zn_2Se_2$ formed on the first layer.
Figure 3C:
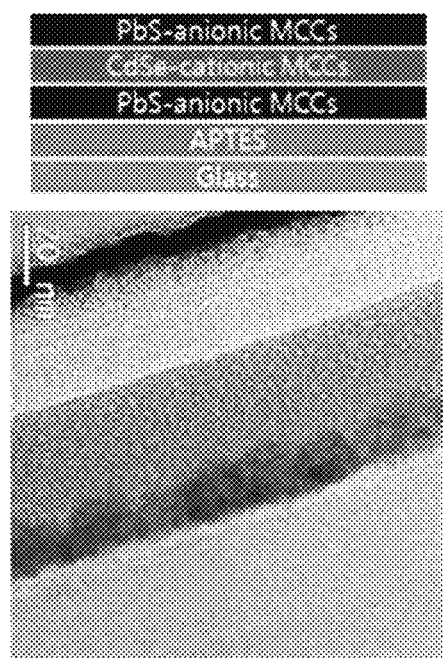
FIG. 3C illustrates a TEM image of a cross-section of a third layer of quantum dots that are surface-modified with anionic $Sn_2S_6$ formed on the second layer.

In FIG. 3, (a) is a transmission electron microscopic (TEM) image of a cross-section of a first layer of quantum dots that are surface-modified with anionic $Sn_2S_6$ formed on the pre-treated glass substrate, (b) is a TEM image of a cross-section of a second layer of quantum dots that are surface-modified with cationic $Zn_2Se_2$ formed on the first layer, and (c) is a TEM image of a cross-section of a third layer of quantum dots that are surface-modified with anionic $Sn_2S_6$ formed on the second layer. Referring to (a) to (c) of FIG. 3, the multilayer film of nanoparticles prepared in Example 1 was found to be formed effectively in a layer-by-layer fashion. In this exemplary embodiment, the first layer, the second layer, and the third layer have a thickness of about 6.5 nm, about 6.5 nm, and about 6.5 nm, respectively.

As described above, according to the one or more of the above embodiments of the present disclosure, the cationic metal-chalcogenide compound and the anionic metal-chalcogenide compound may have smaller sizes than conventional organic ligands and polymers used for stabilization of nanoparticles. Accordingly, in the nanoparticle multilayer film, a distance between the nanoparticle of the first nanoparticle layer and the nanoparticle of the second nanoparticle layer, a distance between nanoparticles in the first nanoparticle layer, and a distance between nanoparticles in the second nanoparticle layer may be significantly reduced. Accordingly, in the nanoparticle multilayer film, the coupling, such as, for example, electronic orbital coupling or magnetic coupling, between the nanoparticles may be further enhanced. Furthermore, the cationic metal-chalcogenide compound and the anionic metal-chalcogenide compound may be electrically semiconductive or electrically conductive. Thus, the nanoparticle multilayer film may have significantly improved electrical conductivity. Due to a synergistic effect of the reduced distance between nanoparticles, the nanoparticle multilayer film may have further enhanced electrical conductivity.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A nanoparticle multilayer film comprising:
   at least one first nanoparticle layer comprising first nanoparticles, said first nanoparticles being surface-modified with a cationic metal-chalcogenide compound; and
   at least one second nanoparticle layer comprising second nanoparticles, said second nanoparticles being surface-modified with an anionic metal-chalcogenide compound,
   wherein the first nanoparticle layer and the second nanoparticle layer are alternately stacked upon one another, and
   wherein the cationic metal-chalcogenide compound and the anionic metal-chalcogenide compound are covalently bonded molecules, and wherein the cationic metal-chalcogenide compound is directly bonded to the surface of the first nanoparticles.

2. The nanoparticle multilayer film of claim 1, wherein the cationic metal-chalcogenide compound is selected from the group consisting of $Zn_2S_2$, $Zn_2Se_2$, $Zn_2Te_2$, $Cu_2S_2$, $Cu_2Se_2$, $Cu_2Te_2$, $Mn_2S_2$, $Mn_2Se_2$, $Mn_2Te_2$, $Fe_2S_2$, $Fe_2Se_2$, $Fe_2Te_2$, $Co_2S_2$, $Co_2Se_2$, $Co_2Te_2$, and a mixture thereof.

3. The nanoparticle multilayer film of claim 1, wherein the nanoparticle of the first nanoparticle layer and the nanoparticle of the second nanoparticle layer are each independently quantum dots, metal nanocrystals, magnetic nanocrystals, oxide nanocrystals, nanowires, or nanoplates.

4. The nanoparticle multilayer film of claim 3, wherein the quantum dots comprise CdS, CdSe, CdTe, ZnS, ZnSe, ZnTe, ZnO, HgS, HgSe, HgTe, CdSeS, CdSeTe, CdSTe, ZnSeS, ZnSeTe, ZnSTe, HgSeS, HgSeTe, HgSTe, CdZnS, CdZnSe, CdZnTe, CdHgS, CdHgSe, CdHgTe, HgZnS, HgZnSe, CdHgZnTe, CdZnSeS, CdZnSeTe, CdZnSTe, CdHgSeS, CdHgSeTe, CdHgSTe, HgZnSeS, HgZnSeTe, HgZnSTe; GaN, GaP, GaAs, GaSb, AlN, AlP, AlAs, AlSb, InN, InP, InAs, InSb, GaNP, GaNAs, GaNSb, GaPAs, GaPSb, AlNP, AlNAs, AlNSb, AlPAs, AlPSb, InNP, InNAs, InNSb, InPAs, InPSb, GaAlNP, GaAlNAs, GaAlNSb, GaAlPAs, GaAlPSb, GaInNP, GaInNAs, GaInNSb, GaInPAs, GaInPSb, InAlNP, InAlNAs, InAlNSb, InAlPAs, InAlPSb; SnS, SnSe, SnTe, PbS, PbSe, PbTe, SnSeS, SnSeTe, SnSTe, PbSeS, PbSeTe, PbSTe, SnPbS, SnPbSe, SnPbTe, SnPbSSe, SnPbSeTe, SnPbSTe; Si, Ge, SiC, SiGe, or a combination thereof.

5. The nanoparticle multilayer film of claim 1, wherein the anionic metal-chalcogenide compound is selected from the group consisting of $Sn_2S_6$, $Sn_2Se_6$, $In_2Se_4$, $In_2Te_3$, $Ga_2Se_3$, $CuInSe_2$, $Cu_7S_4$, $Hg_3Se_4$, $Sb_2Te_3$, ZnTe, and a combination thereof.

6. The nanoparticle multilayer film of claim 1, wherein the nanoparticle of the first nanoparticle layer and the nanoparticle of the second nanoparticle layer are same to or different from each other.

7. The nanoparticle multilayer film of claim 1, wherein the plurality of first nanoparticle layers include the same or different nanoparticle.

8. The nanoparticle multilayer film of claim 1, wherein the plurality of second nanoparticle layers include the same or different nanoparticle.

9. The nanoparticle multilayer film of claim 1, wherein the plurality of first nanoparticle layers include the same or different cationic metal-chalcogenide compound.

10. The nanoparticle multilayer film of claim 1, wherein the plurality of second nanoparticle layers include the same or different anionic metal-chalcogenide compound.

11. The nanoparticle multilayer film of claim 1, wherein the cationic metal-chalcogenide compound and the anionic metal-chalcogenide compound are electrically semiconductive or electrically conductive.

12. The nanoparticle multilayer film of claim 1, wherein the first nanoparticle layer and the second nanoparticle layer are in contact with each other.

13. The nanoparticle multilayer film of claim 1, wherein an average distance between adjacent nanoparticles in the first nanoparticle layer and in the second nanoparticle layer is less than 1 nm.

* * * * *